Dec. 29, 1931.    H. D. GEYER    1,839,094

VARIABLE DIAMETER STEERING SHAFT BUSHING

Filed Feb. 8, 1929

Inventor
Harvey D. Geyer
By Spencer Hardman & Fehr
His Attorneys

Patented Dec. 29, 1931

1,839,094

UNITED STATES PATENT OFFICE

HARVEY D. GEYER, OF DAYTON, OHIO, ASSIGNOR TO THE INLAND MANUFACTURING CO., OF DAYTON, OHIO, A CORPORATION OF DELAWARE

VARIABLE DIAMETER STEERING SHAFT BUSHING

Application filed February 8, 1929. Serial No. 338,418.

This invention relates to vibration damping bearing elements.

The general object of this invention is to provide an automatic take-up bearing element which will be efficient and of long life in use, which can be cheaply manufactured, and which can be very easily and simply assembled in place upon its supporting parts which may vary between relatively wide limits.

Further objects and advantages of the present invention will be apparent from the following description, reference being had to the accompanying drawings, wherein a preferred embodiment of one form of the present invention is clearly shown.

Figure 4:
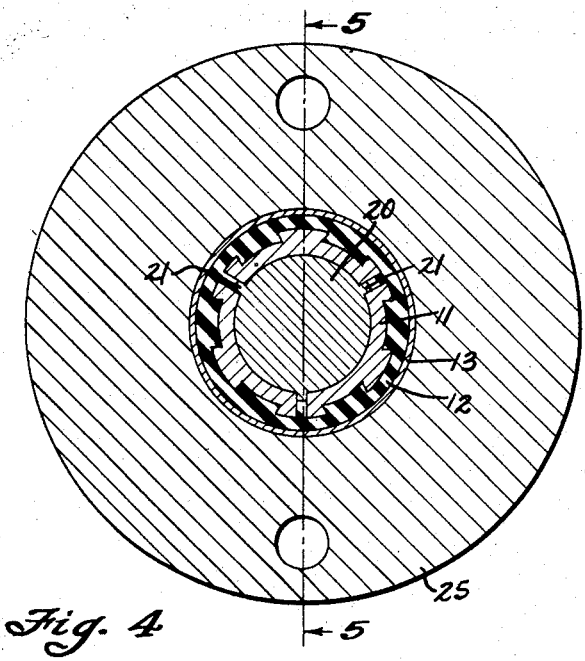
Figure 5:
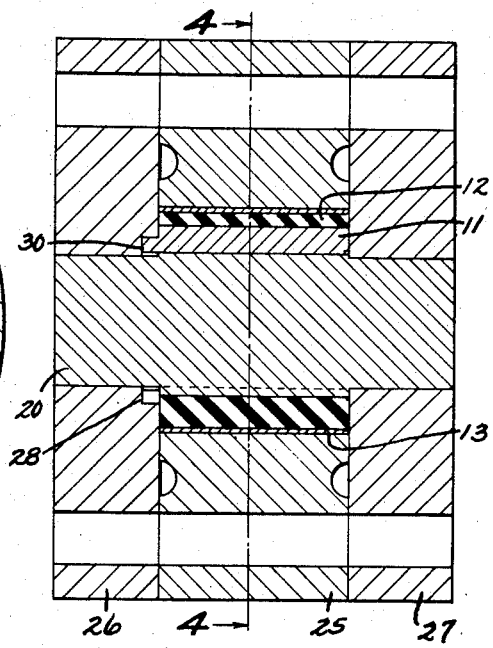

Figs. 4 and 5 illustrate the method of molding the rubber in place between the inner collapsible bearing lining and the outer shell, Fig. 4 being taken on line 4—4 of Fig. 5, and Fig. 5 on line 5—5 of Fig. 4.

Similar reference characters refer to similar parts throughout the several drawings.

Figure 2:
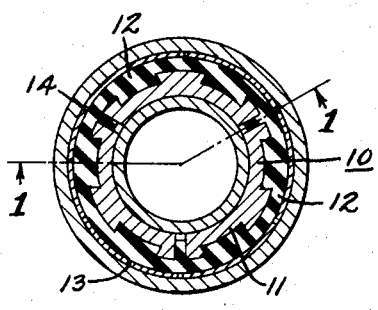
Fig. 2 is a section on line 2—2 of Fig. 1.
Figure 3:
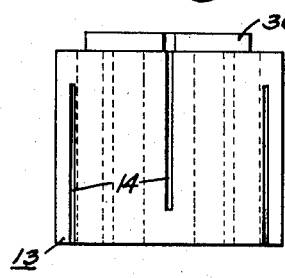
Fig. 3 is a side elevation of the unitary bearing element removed from its associated parts.
Figure 1:
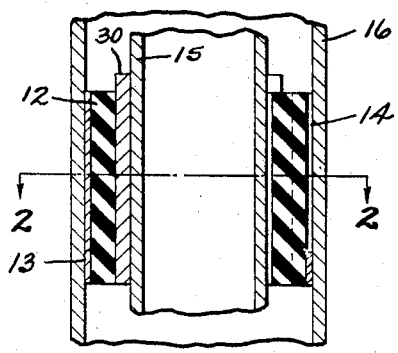
Fig. 1 is a vertical section on line 1—1 of Fig. 2, through a bearing element made according to this invention, assembled in place between an inner rotary tube and an outer supporting tube. The inner tube may be a steering shaft and the outer tube the stationary mast jacket ordinarily found on present day automobiles.

In Figs. 1, 2 and 3 numeral 10 designates as a whole the collapsible inner bearing lining, which is here shown as being made from three separate cylindrical segments or arcs 11, preferably of a self lubricating metal such as porous bronze impregnated with a lubricant. These arcs 11 are held in place by a soft rubber bushing 12 which is under some compression when assembled as shown in Figs. 1 and 2, and therefore they are yieldingly pressed by the rubber 12 in contact with the rotary shaft 15. The ends of these arcs 11 are spaced slightly apart to permit of the desired collapsing of this bearing lining 10 for the purpose of taking up wear and for the purpose of avoiding the necessity of machining the shaft 15 to accurate limits. In the case of tubular shafts ordinarily used for steering shafts in automobiles, no machining of the shaft is necessary at all.

The rubber bushing 12 is preferably encased in a metal sleeve 13 which is preferably made slightly collapsible by the slots 14 therein (see especially Fig. 3). Slots 14 extend alternately from opposite ends of sleeve 13 and overlap a considerable distance at the central portion of the sleeve and hence the entire sleeve 13 may be easily compressed or contracted a considerable amount without distorting its cylindrical shape. This outer sleeve 13 may be vulcanized in place upon the rubber bushing 12 and slotted either before or after vulcanization, or the rubber bushing 12 with lining 10 fixed in place therein may be forced into sleeve 13 with suitable tools in a manner well known, thus putting the rubber under any desired amount of initial compression. The collapsibility of the outer sleeve 13 permits the entire bearing element to be inserted snugly in place within its supporting recess, such as within the interior of tube 16, the variable outside diameter of this bearing element rendering accurate machining of the supporting recess unnecessary. In the case of tubular mast jackets for the steering shafts of automobiles no machining of the tube 16 is necessary at all, since the variation in the size of such tubes can be easily taken care of by the compressibility of sleeve 13.

In some cases where high initial compression of the rubber bushing 12 is desired, sleeve 13 is first made of such larger diameter that when the bearing element is forced into the recess in its supporting part the rubber will be put under the desired initial compression. In such cases the outer sleeve 13 serves to protect the rubber bushing during such assembling as well as facilitates the slipping of the unitary bearing element into its supporting recess.

If desired, the outer sleeve 13 may be omitted entirely and the rubber bushing 12 made to contact directly with the recess walls of the supporting part; however in such cases the bearing element is more difficult to insert in place and there is danger of harming the rubber bushing 12 during assembling within its supporting part.

Preferably the three segments 11 constituting the collapsible bearing lining 10 and the outer sleeve 13 are both vulcanized in situ when the rubber bushing 12 is vulcanized. Figs. 4 and 5 illustrate how these parts may be easily supported in place within the mold cavity during vulcanization. The three segments 11 of the inner bearing lining 10 are held properly spaced upon the central pin 20 of the mold by the three longitudinal ridges 21, the unvulcanized rubber being between the outside of the segments 11 and the inside of the outer sleeve 13. The pin 20 with the metal and rubber parts of the bearing element assembled thereupon is inserted into the cylindrical recess of the central mold section 25, and the two end sections 26 and 27 of the mold slipped over the projecting ends of pin 20 to form a completely enclosed mold cavity, as clearly shown in Fig. 5. The mold parts are of course held tightly clamped together during vulcanization in any suitable manner now well known. The mold part 26 is provided with an annular recess 28 into which the projecting ends 30 of the lining segments 11 fit snugly and are thus more securely held fixed in place during vulcanization (see Fig. 5). After vulcanization is completed, the mold parts are separated and the bearing element is pushed from the recess in the central mold section 25. Preferably the slots 14 are cut in the outer shell 13 after vulcanizing instead of prior thereto, so that no rubber lies within slots 14 when the bearing element is in normal or non-contracted condition.

While the form of embodiment of the present invention as herein disclosed, constitutes a preferred form, it is to be understood that other forms might be adopted, all coming within the scope of the claims which follow.

What is claimed is as follows:

1. A bearing element comprising: a slightly collapsible metallic bearing lining and a surrounding bushing of elastic material tending to collapse said lining, and an exterior casing for said bushing.

2. A bearing element comprising: a slightly collapsible metallic bearing lining and a surrounding bushing of elastic material tending to collapse said lining, and an exterior collapsible casing for said bushing.

3. A bearing element comprising: a slightly collapsible metallic bearing lining and a surrounding bushing of elastic material tending to collapse said lining, and an exterior slotted metal casing for said bushing.

4. A bearing element comprising: a slightly collapsible metallic bearing lining and a surrounding bushing of elastic material tending to collapse said lining and an exterior metal casing for said bushing, said casing having a plurality of longitudinal slots therein so disposed that said casing is radially collapsible.

5. A bearing element comprising: a slightly collapsible metallic bearing lining and a surrounding bushing of elastic material tending to collapse said lining, and an exterior metal casing for said bushing, said casing having a plurality of longituidnal slots therein extending alternately from opposite ends thereof and spaced in a peripheral direction.

6. A unitary bearing element comprising: an exterior collapsible retaining shell, an interior collapsible lining, and an intervening elastic material tending to expand said shell and collapse said lining.

7. A unitary bearing element comprising: an exterior collapsible retaining shell, an interior collapsible lining, and intervening elastic rubber vulcanized in situ.

8. A unitary bearing element comprising: an exterior slotted metal sleeve, an interior collapsible lining, and intervening soft rubber yieldingly expanding said exterior sleeve and yieldingly contracting said lining.

In testimony whereof I hereto affix my signature.

HARVEY D. GEYER.